United States Patent
Ikeno et al.

(10) Patent No.: US 7,059,627 B2
(45) Date of Patent: *Jun. 13, 2006

(54) AIR BAG COATING COMPOSITION

(75) Inventors: Masayuki Ikeno, Gunma-ken (JP);
Atsushi Yaginuma, Gunma-ken (JP);
Syuichi Azechi, Gunma-ken (JP);
Takeshi Miyao, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 10/430,305

(22) Filed: May 7, 2003

(65) Prior Publication Data

US 2003/0211340 A1    Nov. 13, 2003

(30) Foreign Application Priority Data

May 10, 2002  (JP) .............................. 2002-134968

(51) Int. Cl.
 *B60R 21/16* (2006.01)
 *B32B 27/12* (2006.01)
 *C08L 83/04* (2006.01)

(52) U.S. Cl. .................... 280/728.1; 428/447; 524/860; 524/861; 524/862; 524/863; 524/866

(58) Field of Classification Search ................ 524/858, 524/859, 860, 861, 862, 863, 866; 428/447; 280/728.1
See application file for complete search history.

(56) References Cited

U.S. PATENT DOCUMENTS

| | | |
|---|---|---|
| 3,159,601 A | 12/1964 | Ashby |
| 3,159,602 A | 12/1964 | Hamilton et al. |
| 3,220,972 A | 11/1965 | Lamoreaux |
| 3,755,452 A | 8/1973 | Sinn et al. |
| 5,399,402 A | 3/1995 | Inoue et al. |
| 5,789,084 A | 8/1998 | Nakamura et al. |
| 5,877,256 A | 3/1999 | Nakamura et al. |
| 6,056,316 A * | 5/2000 | Yamaji et al. ........... 280/730.2 |
| 6,387,520 B1 * | 5/2002 | Fujiki et al. ................ 428/447 |
| 6,420,037 B1 * | 7/2002 | Tsuji et al. ................. 428/447 |
| 6,425,600 B1 | 7/2002 | Fujiki et al. |
| 6,709,752 B1 * | 3/2004 | James et al. ................ 428/447 |
| 2002/0129898 A1 * | 9/2002 | Takuman et al. .......... 156/329 |
| 2004/0222618 A1 * | 11/2004 | Azechi et al. ........... 280/728.1 |

FOREIGN PATENT DOCUMENTS

| | | |
|---|---|---|
| EP | 0 663 468 A1 | 7/1995 |
| JP | 2-158442 A | 6/1990 |

* cited by examiner

*Primary Examiner*—Michael J. Feely
(74) *Attorney, Agent, or Firm*—Birch, Stewart, Kolasch & Birch, LLP

(57) ABSTRACT

A silicone rubber coating composition which cures into a silicone rubber having a tear strength of 25–50 kN/m and a peeling bond strength of 30–60 N/cm is suited for coating of hollow weave type air bags. A hollow weave type air bag coated with the coating composition can be instantaneously inflated while the bag prevents the silicone rubber film from being peeled from the base fabric, eliminates inflating gas leakage, and retains an acceptable inflation time.

9 Claims, No Drawings

AIR BAG COATING COMPOSITION

This invention relates to a silicone rubber coating composition for an air bag having a hollow weave bag portion, and an air bag coated therewith.

BACKGROUND ART

Prior art air bags are made by mating a pair of plain weave fabric pieces coated or lined with rubber on the inner surface, joining them along the periphery with an adhesive, and stitching the adhesive-joined portions together, the air bags being referred to as plain weave type. However, when it is desired to accommodate air bags in narrow pockets as available in front pillar, roof side rail, center pillar, and quarter pillar zones, the prior art plain weave type air bags lack compactness due to the thickness of the stitched portion.

To combat this situation, JP-A 2-158442 proposes an air bag having a bag portion formed by hollow weaving, eliminating a need for adhesive bonds. This air bag is referred to as hollow weave type. The hollow weave type air bag is fully compact, but raises another problem. Because of the structure of the hollow weave type air bag, the rubber coating layer is applied to the outside surface of the air bag as opposed to the plain weave type. Then, upon inflation, the inflating gas acts on the bag from the base fabric side as opposed to the plain weave type where the gas acts from the rubber coating side. Although it is desired to ensure that the bag be kept inflated for a certain time, the conventional rubber coating composition used in the plain weave type fails to hold the same inflation time for the hollow weave type air bag.

SUMMARY OF THE INVENTION

Therefore, an object of the present invention is to provide a silicone rubber coating composition for air bags of the hollow weave type, capable of holding an acceptable inflation time, and a hollow weave type air bag having a coating layer thereof.

Analyzing the factors associated with inflating gas leakage, the inventor has found that when a hollow weave type air bag is coated with a silicone rubber coating composition, especially of the addition reaction cure type, which cures into a silicone rubber having a tear strength of at least 25 kN/m and a peeling bond strength of at least 30 N/cm, the resulting air bag is capable of retaining an acceptable inflation time.

Accordingly, the present invention provides a silicone rubber coating composition for an air bag having a hollow weave bag portion, the cured composition having a tear strength of at least 25 kN/m and a peeling bond strength of at least 30 N/cm.

The present invention also provides an air bag having a hollow weave bag portion, having a rubber coating layer of the coating composition thereon.

DESCRIPTION OF THE PREFERRED EMBODIMENTS

The silicone rubber coating composition of the invention suitable for use in hollow weave type air bags is preferably of the addition reaction curing type, typically comprising (A) 100 parts by weight of an organopolysiloxane containing on the average at least two alkenyl groups in a molecule, (B) an amount of an organohydrogenpolysiloxane containing at least two silicon atom-bonded hydrogen atoms in a molecule to give 1 to 7 moles of silicon atom-bonded hydrogen atoms per mole of silicon atom-bonded alkenyl groups in component (A), (C) a catalytic amount of an addition reaction catalyst, (D) 1 to 50 parts by weight of finely divided silica having a specific surface area of at least 50 $m^2/g$ as measured by the BET method, and (E) 0.1 to 10 parts by weight of an organosilicon compound having a tackifying functional group.

The organopolysiloxane (A) serving as a base component of the composition contains on the average at least two alkenyl groups each attached to a silicon atom in a molecule. The alkenyl groups are usually those of about 2 to 8 carbon atoms, preferably 2 to 4 carbon atoms, including vinyl, allyl, butenyl, pentenyl, hexenyl, and heptenyl, with vinyl being most preferred.

In the organopolysiloxane, silicon atom-bonded alkenyl groups may be located, for example, at ends and/or side chains of the molecular chain. The organopolysiloxane contains silicon atom-bonded organic groups other than the alkenyl groups. Such other organic groups include unsubstituted or halo-substituted monovalent hydrocarbon groups of about 1 to 12 carbon atoms, preferably about 1 to 10 carbon atoms, for example, alkyl groups such as methyl, ethyl, propyl, butyl, pentyl, hexyl, cyclohexyl, and heptyl; aryl groups such as phenyl, tolyl, xylyl and naphthyl; aralkyl groups such as benzyl and phenethyl; and halogenated alkyl groups such as chloromethyl, 3-chloropropyl and 3,3,3-trifluoropropyl, with methyl and phenyl being preferred. The content of alkenyl groups in component (A) is preferably about 0.001 to about 10 mol %, especially about 0.01 to about 5 mol % of the entire monovalent organic groups (or substituted or unsubstituted monovalent hydrocarbon groups) bonded to silicon atoms.

The molecular structure of the organopolysiloxane (A) may be a straight, partially branched straight, cyclic or branched chain, for example. Preferred is a straight chain diorganopolysiloxane whose backbone consists essentially of recurring diorganosiloxane units and whose molecular chain is blocked with a triorganosiloxy group at either end. It is noted that the organo groups used herein can include alkenyl. The organopolysiloxane (A) should preferably have a viscosity of 100 to 500,000 mPa·s at 25° C., more preferably 300 to 100,000 mPa·s at 25° C. because the resulting silicone rubber has excellent physical properties and the resulting composition becomes easy to handle.

Examples of the organopolysiloxane (A) include trimethylsiloxy end-capped dimethylsiloxane-methylvinylsiloxane copolymers, trimethylsiloxy end-capped methylvinylpolysiloxane, trimethylsiloxy end-capped dimethylsiloxane-methylvinylsiloxane-methylphenylsiloxane copolymers, dimethylvinylsiloxy end-capped dimethylpolysiloxane, dimethylvinylsiloxy end-capped methylvinylpolysiloxane, dimethylvinylsiloxy end-capped dimethylsiloxane-methylvinylsiloxane copolymers, dimethylvinylsiloxy end-capped dimethylsiloxane-methylvinylsiloxane-methylphenylsiloxane copolymers, trivinylsiloxy end-capped dimethylpolysiloxane, organopolysiloxane copolymers consisting of siloxane units represented by the formula: $R^1_3SiO_{1/2}$, siloxane units represented by the formula: $R^1_2R^2SiO_{1/2}$, units represented by the formula: $R^1_2SiO$ and a minor amount of siloxane units represented by the formula: $SiO_2$, organopolysiloxane copolymers consisting of siloxane units represented by the formula: $R^1_3SiO_{1/2}$, siloxane units represented by the formula: $R^1_2R^2SiO_{1/2}$, and siloxane units represented by the formula: SiO$_2$, organopolysiloxane copolymers consisting of siloxane units represented by the formula: R$^1{}_2$R$^2$SiO$_{1/2}$, units represented by the formula: R$^1{}_2$SiO and siloxane units represented by the formula: SiO$_2$, organopolysiloxane copolymers consisting of siloxane units represented by the formula: R$^1$R$^2$SiO and a minor amount of siloxane units represented by the formula: R$^1$SiO$_{3/2}$ or R$^2$SiO$_{3/2}$, and mixtures of two or more of the foregoing.

Throughout the specification, the term "end-capped" used in connection with siloxanes means that a siloxane is capped with a specified group at each end of its molecular chain.

In the above formulae, R$^1$ is a substituted or unsubstituted monovalent hydrocarbon group other than alkenyl groups, for example, alkyl groups such as methyl, ethyl, propyl, butyl, pentyl, hexyl, cyclohexyl, and heptyl; aryl groups such as phenyl, tolyl, xylyl and naphthyl; aralkyl groups such as benzyl and phenethyl; and halogenated alkyl groups such as chloromethyl, 3-chloropropyl and 3,3,3-trifluoropropyl. R$^2$ is an alkenyl group such as vinyl, allyl, butenyl, pentenyl, hexenyl or heptenyl.

From the requirement that the cured silicone rubber have a tear strength of at least 25 kN/m and a peeling bond strength of at least 30 N/cm, the alkenyl-bearing organopolysiloxane (A) is preferably a combination of an alkenyldiorganosiloxy end-capped (alkenyl group-free backbone) diorganopolysiloxane (e.g., dimethylvinylsiloxy end-capped dimethylpolysiloxane) with an alkenyldiorganosiloxy or triorganosiloxy end-capped diorganosiloxane-alkenylorganosiloxane copolymer (e.g., dimethylvinylsiloxy or trimethylsiloxy end-capped dimethylsiloxane-vinylmethylsiloxane copolymer). It is noted that the organo groups used herein should exclude alkenyl.

The organohydrogenpolysiloxane (B) reacts with component (A) and serves as a crosslinking agent. Its molecular structure is not critical. Any of straight, cyclic, branched and three-dimensional network structure (resinous) manufactured in the prior art may be used. It should contain at least two, preferably at least three silicon atom-bonded hydrogen atoms (hydrosilyl groups represented by SiH) in a molecule. Typically, the organohydrogenpolysiloxane contains 2 to about 500, preferably 3 to about 200, more preferably 3 to about 100 SiH groups. The organohydrogenpolysiloxane used herein often has the average compositional formula (1).

$$R^3{}_b H_c SiO_{(4-b-c)/2} \quad (1)$$

In formula (1), R$^3$ is an aliphatic unsaturation-free, substituted or unsubstituted monovalent hydrocarbon group, preferably having 1 to 10 carbon atoms, attached to a silicon atom. Suitable monovalent hydrocarbon groups represented by R$^3$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl and phenylpropyl, and substituted ones of the foregoing in which some or all of the hydrogen atoms are substituted with halogen atoms (e.g., fluoro, bromo or chloro), such as chloromethyl, chloropropyl, bromoethyl and trifluoropropyl. The preferred monovalent hydrocarbon groups represented by R$^3$ are alkyl and aryl groups, with methyl and phenyl being most preferred. The subscript b is a positive number of 0.7 to 2.1, c is a positive number of 0.001 to 1.0, and the sum of b+c is 0.8 to 3.0, and preferably, b is 1.0 to 2.0, c is 0.01 to 1.0, and b+c is 1.5 to 2.5.

At least two, preferably at least three SiH groups are included per molecule while they may be located either at ends or midway of the molecular chain or both. The molecular structure of the organohydrogenpolysiloxane may be straight, cyclic, branched or three-dimensional network structure. For the physical properties of the resulting silicone rubber and ease of handling of the resulting composition, the number of silicon atoms per molecule (that is, degree of polymerization) is preferably from 2 to about 1,000, more preferably 3 to about 300, even more preferably 4 to about 150. For the same reason, the preferred organohydrogenpolysiloxane is liquid at room temperature (25° C.) and specifically, has a viscosity at 25° C. of about 0.1 to 5,000 mPa·s, preferably about 0.5 to 1,000 mPa·s, more preferably about 5 to 500 mPa·s.

Examples of the organohydrogenpolysiloxane (B) include trimethylsiloxy end-capped methylhydrogenpolysiloxane, trimethylsiloxy end-capped dimethylsiloxane-methylhydrogensiloxane copolymers, trimethylsiloxy end-capped dimethylsiloxane-methylhydrogensiloxane-methylphenylsiloxane copolymers, dimethylhydrogensiloxy end-capped dimethylpolysiloxane, dimethylhydrogensiloxy end-capped dimethylpolysiloxane-methylhydrogensiloxane copolymers, dimethylhydrogensiloxy end-capped dimethylsiloxane-methylphenylsiloxane copolymers, dimethylhydrogensiloxy end-capped dimethylphenylpolysiloxane, organopolysiloxane copolymers consisting of siloxane units represented by the formula: R$^1{}_3$SiO$_{1/2}$, siloxane units represented by the formula: R$^1{}_2$HSiO$_{1/2}$ and a minor amount of siloxane units represented by the formula: SiO$_2$, organopolysiloxane copolymers consisting of siloxane units represented by the formula: R$^1{}_2$HSiO$_{1/2}$ and a minor amount of siloxane units represented by the formula: SiO$_2$, organopolysiloxane copolymers consisting of siloxane units represented by the formula: R$^1$HSiO and a minor amount of siloxane units represented by the formula: R$^1$SiO$_{3/2}$ or HSiO$_{3/2}$, and mixtures of two or more of the foregoing. It is noted that R$^1$ is a substituted or unsubstituted monovalent hydrocarbon group other than alkenyl, which is as described and exemplified above.

From the requirement that the cured silicone rubber have a tear strength of at least 25 kN/m and a peeling bond strength of at least 30 N/cm, the organohydrogenpolysiloxane (B) is preferably a combination of a triorganosiloxy end-capped organohydrogenpolysiloxane (e.g., trimethylsiloxy end-capped methylhydrogenpolysiloxane) with a triorganosiloxy or diorganohydrogensiloxy end-capped diorganosiloxane-organohydrogensiloxane copolymer (e.g., trimethylsiloxy or dimethylhydrogensiloxy end-capped dimethylsiloxane-methylhydrogensiloxane copolymer). It is noted that the organo groups used herein should exclude alkenyl.

Component (B) is compounded in such amounts that 1 to 7 moles, preferably 2 to 5 moles of silicon atom-bonded hydrogen atoms in component (B) are available per mole of silicon atom-bonded alkenyl groups in component (A). If less than 1 mole of silicon atom-bonded hydrogen atoms in component (B) are available per mole of silicon atom-bonded alkenyl groups in component (A), then the coating film has insufficient strength. If more than 7 moles of silicon atom-bonded hydrogen atoms in component (B) are available per mole of silicon atom-bonded alkenyl groups in component (A), then the coating film suffers an extreme loss of heat resistance.

Component (C) is any catalyst which can promote the addition reaction between alkenyl groups in component (A) and SiH groups in component (B). Suitable catalysts include platinum group metals and compounds thereof, for example, platinum, palladium, rhodium, etc., chloroplatinic acid, alcohol-modified chloroplatinic acid, coordinate compounds of chloroplatinic acid with olefins, vinylsiloxanes or acetylene compounds, tetrakis(triphenylphosphine)palladium and chlorotris(triphenylphosphine)rhodium. Of these, platinum compounds are preferred. Component (C) is used in catalytic amounts, preferably such as to give 1 to 500 ppm, more preferably 10 to 100 ppm of catalytic metal element based on the weight of components (A) and (B) combined. With less than 1 ppm of component (C), the addition reaction may be substantially retarded or the composition may not cure. More than 500 ppm of component (C) may adversely affect the heat resistance of the cured polysiloxane composition.

Component (D) is finely divided silica serving as a reinforcing agent. It imparts high tear strength to the inventive composition. Using finely divided silica as a reinforcing agent, it becomes possible to form a coating film meeting the tear properties required by the invention. The finely divided silica should have a specific surface area of at least 50 m²/g, preferably 50 to 400 m²/g, more preferably 100 to 300 m²/g, as measured by the BET method. A silica powder with a specific surface area of less than 50 m²/g fails to impart satisfactory tear strength.

As long as the specific surface area is within the above-specified range, component (D) may be any of silica powders which are ordinarily used as a reinforcing filler for silicone rubber, for example, fumed silica and precipitated silica. Such silicas may be used alone or in admixture. The finely divided silica may be used as such although it is preferred to use silicas treated with organosilicon compounds such as methylchlorosilanes (e.g., trimethylchlorosilane, dimethyldichlorosilane and methyltrichlorosilane), dimethylpolysiloxane, hexaorganodisilazanes (e.g., hexamethyldisilazane, divinyltetramethyldisilazane and dimethyltetravinyldisilazane) in order to impart good flow to the inventive composition.

Component (D) is compounded in amounts of 1 to 50 parts by weight, preferably 5 to 15 parts by weight per 100 parts by weight of component (A). Too small amounts of component (D) fail to achieve the required tear strength whereas too large amounts of component (D) adversely affect the flow of the composition to impede coating operation.

Component (E) is intended to improve the adhesion of the composition to synthetic fiber woven fabric bases or non-woven fabric bases for air bags, or thermoplastic resin sheets or film bases. From the standpoint of imparting self-tack to addition reaction type silicone rubber compositions, a silicon compound having a tackifying functional group is selected as component (E). Examples of the functional group include an alkenyl group bonded to a silicon atom, such as vinyl or allyl; an epoxy group bonded to a silicon atom through a carbon atom or atoms, such as γ-glycidoxypropyl or β-(3,4-epoxycyclohexyl)ethyl; a (meth)acryloxy group such as γ-acryloxypropyl or γ-methacryloxypropyl; an alkoxysilyl group such as an alkoxysilyl group (e.g., trimethoxysilyl, triethoxysilyl or methyldimethoxysilyl) bonded to a silicon atom through an alkylene group which may contain one or two ester, urethane or ether structures; an organosilane having a SiH group, a straight or cyclic siloxane oligomer having 3 to 50 silicon atoms, especially 5 to 20 silicon atoms, and an (alkoxy)silyl-modified triallyl isocyanurate and siloxane derivatives thereof. A silicon compound having such functional groups of two or more types per molecule is preferred. Examples of the silicon compound having such functional groups are given below.

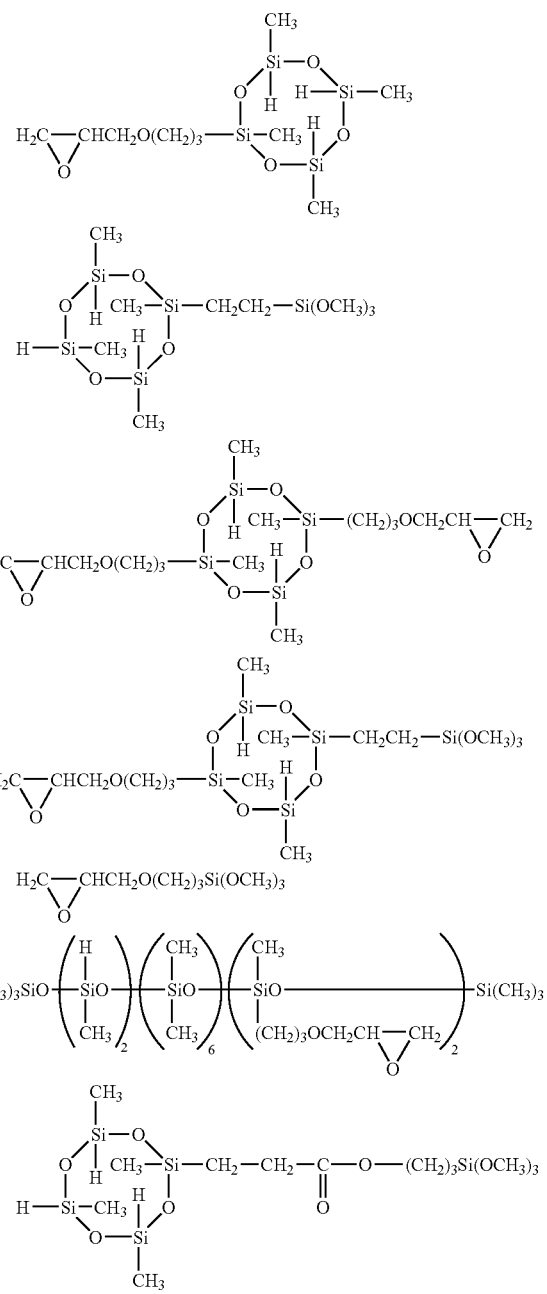

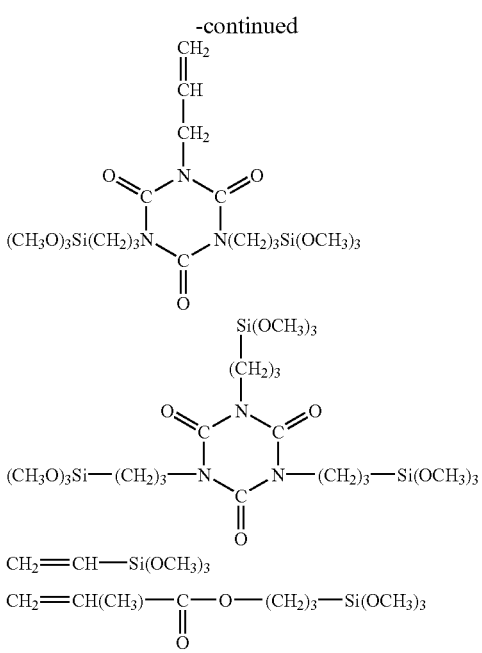

CH₂=CH—Si(OCH₃)₃

CH₂=CH(CH₃)—C—O—(CH₂)₃—Si(OCH₃)₃
       ‖
       O

Component (E) is compounded in amounts of 0.1 to 10 parts by weight, preferably 0.5 to 5 parts by weight, per 100 parts by weight of component (A). Too small amounts of component (E) may fail to provide a satisfactory peeling bond strength whereas too large amounts of component (E) may be uneconomical.

In addition to the above-described components (A) to (E), the coating composition may further include optional components. Typically, there is compounded any of regulators well known as exerting a cure-restraining effect to the addition reaction catalyst. Suitable regulators include phosphorus-containing compounds such as triphenylphosphine, nitrogen-containing compounds such as tributylamine, tetramethylethylenediamine and benzotriazole, sulfur-containing compounds, acetylene compounds, compounds containing two or more alkenyl groups, hydroperoxy compounds, and maleic acid derivatives. The extent of the cure-restraining effect by the regulator largely varies with the chemical structure of the regulator. Therefore, the amount of the regulator added should be determined to be optimum for the particular regulator used. As a general rule, too small amounts of the regulator fail to provide long-term shelf stability at room temperature whereas too large amounts rather interfere with curing.

Other optional components include, for example, inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, layer mica, carbon black, diatomaceous earth, and glass fibers, as well as the foregoing fillers which have been surface treated with organosilicon compounds such as organoalkoxysilanes, organochlorosilanes, organosilazanes, and low molecular weight siloxanes. Besides, silicone rubber powder and silicone resin powder are also useful.

Other optional components which can be used in the coating composition as long as they do not compromise the objects of the invention include organopolysiloxanes containing one silicon atom-bonded hydrogen atom or alkenyl group per molecule, organopolysiloxanes free of a silicon atom-bonded hydrogen atom or alkenyl group, organic solvents, anti-crepe-hardening agents, plasticizers, thixotropic agents, pigments, dyes, and mildew-proof agents.

The coating composition can be prepared by mixing the essential and optional components. The composition thus obtained is used as a coating agent for hollow weave type air bags. To this end, the coating composition is preferably liquid and especially, has a viscosity of about 50 to about 200 Pa·s at 25° C.

The coating composition of the invention can be cured under conditions which are well known to conventional addition reaction curing silicone rubber compositions, typically at a temperature of about 120 to 180° C. for a time of about 1 to 10 minutes.

The coating composition of the invention cures into a product or silicone rubber which should have a tear strength of at least 25 kN/m, usually 25 to 50 kN/m, preferably 27 to 50 kN/m, more preferably 30 to 40 kN/m, and a peeling bond strength of at least 30 N/cm, usually 30 to 60 N/cm, preferably 35 to 50 N/cm, more preferably 40 to 50 N/cm. With too low a tear strength, the coating layer at the joint can be cracked upon inflation of the air bag, failing to retain an inflation time. With too low a peeling bond strength, the coating layer at the joint can be separated from the base fabric upon inflation of the air bag, failing to retain an inflation time.

It is noted that the tear strength is measured according to JIS K6249. The peeling bond strength is measured by sandwiching the composition between a pair of air bag-forming nylon 66 (420 denier) woven fabric pieces so that the composition has a thickness of 0.5 mm, curing the composition at 170° C. and a pressure of 5 kgf/cm² for 1 minute, cutting into a specimen of 2.5 cm wide and 20 cm long and performing a peeling bond strength test on the specimen at a peeling angle of 180° and a pulling speed of 50 mm/min.

In the practice of the invention, the hollow weave type air bag on which a silicone rubber layer is to be formed by coating and curing the above-described composition may be of well-known construction, for example, hollow weave type air bags using as the base fabric woven fabrics of synthetic fibers such as nylon 66, nylon 6, polyester, aramid, polyamide, and polyester fibers.

Any conventional technique may be employed in coating the composition to such hollow weave type air bags. The buildup of the coating layer or surface coverage is preferably about 15 to 150 g/m², more preferably about 15 to 80 g/m², most preferably about 20 to 40 g/m².

EXAMPLE

Examples of the invention are given below by way of illustration and not by way of limitation. All parts are by weight and the viscosity is a measurement at 25° C. The tackifiers X, Y and Z used are identified below.

Tackifier X

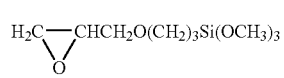

Tackifier Y

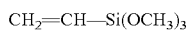

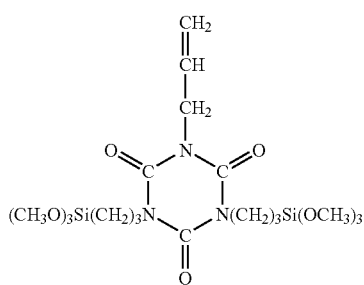

Tackifier Z

EXAMPLE 1

A composition A was prepared by mixing the following: 80 parts of a dimethylvinylsiloxy end-capped dimethylpolysiloxane and having a viscosity of 10 Pa·s, 4 parts of a trimethylsiloxy end-capped dimethylsiloxane-methylvinylsiloxane copolymer containing 5 mol % of vinylmethylsiloxane units and 95 mol % of dimethylsiloxane units in the diorganosiloxane units of the backbone and having a viscosity of 0.7 Pa·s, 17 parts of hydrophobic silica treated with trimethylsilyl groups and having a specific surface area of 120 m$^2$/g, 1.0 part of a trimethylsiloxy end-capped methylhydrogenpolysiloxane (silicon atom-bonded hydrogen atom content=1.45 wt %) having a viscosity of 5 mPa·s, 2.2 parts of a dimethylsiloxane-methylhydrogensiloxane copolymer having silicon atom-bonded hydrogen atoms at both ends and side chains of the molecular chain (silicon atom-bonded hydrogen atom content=0.54 wt %) and having a viscosity of 12 mPa·s (giving H/Vi=3.9 mol/mol), 0.05 part of 1-ethynyl cyclohexanol, an amount of a complex of chloroplatinic acid with divinyltetramethyldisiloxane to give 30 ppm of platinum metal based on the total weight of the components, 1.5 parts of Tackifier X, 0.5 part of Tackifier Y, and 0.5 part of octyl titanate.

Note that "H/Vi" is a molar ratio of a total SiH group content in component (B) to a total vinyl group content in vinyl-containing organopolysiloxanes as component (A).

The composition was cured at 150° C. for 5 minutes. A sheet was formed therefrom and measured for physical properties according to JIS K6249. A peeling bond strength test was carried out by sandwiching the composition between a pair of air bag-forming nylon 66 (420 denier) woven fabric pieces so that the composition had a thickness of 0.5 mm, curing the composition at 170° C. and a pressure of 5 kgf/cm$^2$ for 1 minute, and cutting into a specimen of 2.5 cm x 20 cm.

Using a coater, the silicone rubber composition was uniformly coated to a hollow weave air bag, without any variation in buildup, to a permissible minimum coverage. The coating was cured by heating at 170° C. for one minute in an oven, completing a hollow weave air bag. An inflation test was performed on the air bag by instantaneously injecting air into the bag at a pressure of 7 kg/cm$^2$ within 3 seconds and visually inspecting air-tightness, that is, observing whether the silicone rubber film was peeled off. The results are shown in Table 1.

EXAMPLE 2

A composition B was prepared by mixing the following: 17 parts of a dimethylvinylsiloxy end-capped dimethylpolysiloxane and having a viscosity of 100 Pa·s, 33 parts of a dimethylvinylsiloxy end-capped dimethylpolysiloxane and having a viscosity of 10 Pa·s, 30 parts of a dimethylvinylsiloxy end-capped dimethylpolysiloxane and having a viscosity of 1 Pa·s, 3 parts of a trimethylsiloxy end-capped dimethylsiloxane-methylvinylsiloxane copolymer containing 10 molt of vinylmethylsiloxane units and 90 molt of dimethylsiloxane units in the diorganosiloxane units of the backbone and having a viscosity of 0.7 Pa·s, 5 parts of an organopolysiloxane resin consisting of 39.5 molt of $(CH_3)_3SiO_{1/2}$ units, 6.5 molt of $(CH_3)_2(CH_2=CH)SiO_{1/2}$ units, and 54 molt of $SiO_2$ units, 22 parts of hydrophobic silica treated with trimethylsilyl groups and having a specific surface area of 170 m$^2$/g, 1.8 part of a trimethylsiloxy end-capped methylhydrogenpolysiloxane (silicon atom-bonded hydrogen atom content=1.14 wt %) having a viscosity of 45 mPa·s, 5.3 parts of a dimethylsiloxane-methylhydrogensiloxane copolymer having silicon atom-bonded hydrogen atoms at both ends and side chains of the molecular chain (silicon atom-bonded hydrogen atom content=0.54 wt %) and having a viscosity of 12 mPa·s (giving H/Vi=3.4 mol/mol), 0.03 part of 1-ethynyl cyclohexanol, an amount of a complex of chloroplatinic acid with divinyltetramethyldisiloxane to give 15 ppm of platinum metal based on the total weight of the components, 0.4 part of Tackifier X, 0.2 part of Tackifier Z, and 0.2 part of octyl titanate.

As in Example 1, cured physical properties were measured, and a peeling bond strength test and an inflation test performed. The results are shown in Table 1.

COMPARATIVE EXAMPLE 1

A composition C was prepared by mixing the following: 17 parts of a dimethylvinylsiloxy end-capped dimethylpolysiloxane and having a viscosity of 100 Pa·s, 33 parts of a dimethylvinylsiloxy end-capped dimethylpolysiloxane and having a viscosity of 10 Pa·s, 37 parts of a dimethylvinylsiloxy end-capped dimethylpolysiloxane and having a viscosity of 1 Pa·s, 22 parts of hydrophobic silica treated with trimethylsilyl groups and having a specific surface area of 170 m$^2$/g, 1 part of a trimethylsiloxy end-capped methylhydrogenpolysiloxane (silicon atom-bonded hydrogen atom content=1.14 wt %) having a viscosity of 45 mPa·s, 3 parts of a dimethylsiloxane-methylhydrogensiloxane copolymer having silicon atom-bonded hydrogen atoms at both ends and side chains of the molecular chain (silicon atom-bonded hydrogen atom content=0.54 wt %) and having a viscosity of 12 mPa·s (giving H/Vi=4.1 mol/mol), 0.06 part of 1-ethynyl cyclohexanol, an amount of a complex of chloroplatinic acid with divinyltetramethyldisiloxane to give 15 ppm of platinum metal based on the total weight of the components, 1.5 parts of Tackifier X, and 0.5 part of Tackifier Z. As in Example 1, cured physical properties were measured, and a peeling bond strength test and an inflation test performed. The results are shown in Table 1.

COMPARATIVE EXAMPLE 2

A composition D was prepared by mixing the following: 50 parts of a dimethylvinylsiloxy end-capped dimethylpolysiloxane and having a viscosity of 10 Pa·s, 67 parts of a dimethylvinylsiloxy end-capped dimethylpolysiloxane and having a viscosity of 1 Pa·s, 33 parts of hydrophobic silica treated with trimethylsilyl groups and having a specific surface area of 170 m$^2$/g, 13 parts of an organopolysiloxane resin consisting of 39.5 molt of $(CH_3)_3SiO_{1/2}$ units, 6.5 molt of $(CH_3)_2(CH_2=CH)SiO_{1/2}$ units, and 54 mol % of $SiO_2$ units, 2.7 part of a trimethylsiloxy end-capped methylhydrogenpolysiloxane (silicon atom-bonded hydrogen atom content=1.14 wt %) having a viscosity of 45 mPa·s, 8.3 parts of a dimethylsiloxane-methylhydrogensiloxane copolymer having silicon atom-bonded hydrogen atoms at both ends and side chains of the molecular chain (silicon atom-bonded hydrogen atom content=0.54 wt %) and having a viscosity of 12 mPa·s (giving H/Vi=3.3 mol/mol), 0.05 part of 1-ethynyl cyclohexanol, an amount of a complex of chloroplatinic acid with divinyltetramethyldisiloxane to give 20 ppm of platinum metal based on the total weight of the components, 1.5 parts of Tackifier X, 0.5 part of Tackifier Y, and 0.5 part of octyl titanate. As in Example 1, cured physical properties were measured, and a peeling bond strength test and an inflation test performed. The results are shown in Table 1.

TABLE 1

|  | Example | | Comparative Example | |
| --- | --- | --- | --- | --- |
|  | 1 | 2 | 1 | 2 |
| Hardness (Durometer A) | 35 | 45 | 34 | 44 |
| Tensile strength (MPa) | 3.7 | 6.8 | 6.5 | 6.5 |
| Elongation at shear (%) | 360 | 360 | 420 | 260 |
| Tear strength (kN/m) | 27 | 31 | 24 | 21 |
| Peeling bond strength (N/cm) | 35 | 47 | 5 | 25 |
| Inflation test | no peel | no peel | peeled | peeled |

A hollow weave type air bag coated with the coating composition of the invention can be instantaneously inflated while the bag prevents the silicone rubber film from being peeled from the base fabric, substantially eliminates the risk of gas leakage, and retains an acceptable inflation time.

Japanese Patent Application No. 2002-134968 is incorporated herein by reference.

Reasonable modifications and variations are possible from the foregoing disclosure without departing from either the spirit or scope of the present invention as defined by the claims.

The invention claimed is:

1. An air bag having a hollow weave bag portion, having thereon a rubber coating layer of a coating composition comprising
    (A) 100 parts by weight of an organopolysiloxane containing on the average at least two alkenyl groups in a molecule,
    (B) an amount of an organohydrogenpolysiloxane containing at least two silicon atom-bonded hydrogen atoms in a molecule to give 1 to 7 moles of silicon atom-bonded hydrogen atoms per mole of silicon atom-bonded alkenyl groups in component (A),
    (C) a catalytic amount of an addition reaction catalyst,
    (D) 1 to 50 parts by weight of finely divided silica having a specific surface area of at least 50 m²/g as measured by the BET method, and
    (E) 0.1 to 10 parts by weight of an organosilicon compound having a tackifying functional group,
    wherein the alkenyl group-containing organopolysiloxane (A) comprises an alkenyldiorganosiloxy end-capped diorganopolysiloxane and an alkenyldiorganosiloxy or triorganosiloxy end-capped diorganosiloxane-alkenylorganosiloxane copolymer;
    wherein the organohydrogenpolysiloxane (B) comprises a triorganosiloxy end-capped organohydrogenpolysiloxane and a triorganosiloxy or diorganohydrogensiloxy end-capped diorganosiloxane-organohydrogensiloxane copolymer;
    and the cured composition has a tear strength of at least 25 kN/m and a peeling bond strength of at least 30 N/cm.

2. The air bag of claim 1, wherein: the alkenyldiorganosiloxy end-capped diorganopolysiloxane of component (A) is a dimethylvinylsiloxy end-capped dimethylpolysiloxane; and wherein the akenyldiorganosiloxy or triorganosiloxy end-capped diorganosiloxane-alkenyl organosiloxane copolymer of component (A) is selected from the group consisting of: a trimethylsiloxy end-capped dimethylsiloxane-methylvinylsiloxane copolymer, a trimethylsiloxy end-capped dimethylsiloxane-methylvinylsiloxane-methylphenylsiloxane copolymer, a dimethylvinylsiloxy end-capped dimethylsiloxane-methylvinylsiloxane copolymer, and a dimethylvinylsiloxy end-capped dimethylsiloxane-methylvinylsiloxane-methylphenylsiloxane copolymer.

3. The air bag of claim 1 wherein the organohydrogenpolysiloxane (B) reacts with component (A) and serves as a crosslinking agent.

4. The air bag of claim 1 wherein the triorganosiloxy end-capped organohydrogenpolysiloxane of component (B) is a trimethylsiloxy end-capped methylhydrogenpolysiloxane; and wherein the triorganosiloxy or diorganohydrogensiloxy end-capped diorganosiloxane-organohydrogensiloxane copolymer of component (B) is selected from the group consisting of: a trimethylsiloxy end-capped dimethylsiloxane-methylhydrogensiloxane copolymer, a trimethylsiloxy end-capped dimethylsiloxane-methylhydrogensiloxane-methylphenylsiloxane copolymer, and a dimethylhydrogensiloxy end-capped dimethylpolysiloxane-methylhydrogensiloxane copolymer.

5. The air bag of claim 1 wherein Component (B) is present in an amount such that 2 to 5 moles of silicon atom-bonded hydrogen atoms in component (B) are available per mole of silicon atom-bonded alkenyl groups in component (A).

6. The air bag of claim 1 wherein the catalyst (C) is selected from the group consisting of platinum group metals and compounds thereof.

7. The air bag of claim 1 wherein the finely divided silica (D) has a specific surface area of 100 to 300 m²/g, as measured by the BET method.

8. The air bag of claim 1 wherein the tackifying functional group of the organosilicon compound (E) is selected from the group consisting of vinyl; allyl; an epoxy group bonded to a silicon atom through a carbon atom or atoms; a (meth)acryloxy group; an alkoxysilyl group bonded to a silicon atom through an alkylene group; an organosilane having a SiH group; a straight or cyclic siloxane oligomer having 3 to 50 silicon atoms; and an (alkoxy)silyl-modified triallyl isocyanurate.

9. A method of preparing the air bag of any one of claims 1 and 2–8 having a hollow weave bag portion comprising:
    coating the silicone rubber coating composition onto a hollow weave type base woven fabric; and
    curing the composition.

* * * * *